US009513189B2

(12) United States Patent
Jiang et al.

(10) Patent No.: US 9,513,189 B2
(45) Date of Patent: Dec. 6, 2016

(54) DEVICE AND METHOD TO MEASURE THE DMD AND OTHER PARAMETERS OF A MULTICORE OPTICAL FIBER

(71) Applicant: OFS Fitel, LLC, Norcross, GA (US)

(72) Inventors: Xinli Jiang, Shrewsbury, MA (US); Thierry F Taunay, Bridgewater, NJ (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 14/075,952

(22) Filed: Nov. 8, 2013

(65) Prior Publication Data
US 2014/0125971 A1    May 8, 2014

Related U.S. Application Data

(60) Provisional application No. 61/724,145, filed on Nov. 8, 2012.

(51) Int. Cl.
*G01M 11/00*    (2006.01)
(52) U.S. Cl.
CPC .................... *G01M 11/33* (2013.01)
(58) Field of Classification Search
CPC ..... G01M 11/30; G01M 11/33; G01M 11/331; G01M 11/332; G01M 11/333; G01M 11/334; G01M 11/335; G01M 11/336; G01M 11/337; G01M 11/338; H04B 10/0795; H04B 10/07951; H04B 10/07953; H04B 10/07955; H04B 10/07957
USPC ........................................................ 356/73.1
See application file for complete search history.

(56) References Cited

U.S. PATENT DOCUMENTS

| 4,286,979 | A | * | 9/1981 | Buckler | C03B 37/0253 356/73.1 |
|---|---|---|---|---|---|
| 5,767,957 | A | * | 6/1998 | Barringer | G01M 11/3136 356/73.1 |
| 5,864,644 | A | | 1/1999 | DiGiovanni et al. | |
| 6,111,635 | A | * | 8/2000 | Iida | G01M 11/332 356/73.1 |
| 6,400,450 | B1 | * | 6/2002 | Golowich | G01M 11/332 356/73.1 |

(Continued)

OTHER PUBLICATIONS

Zhu, Benyuan, et al., "70-Gb/s Multicore Multimode Fiber Transmissions for Optical Data Links," Nov. 15, 2010, IEEE Photonics Technology Letters, vol. 22, No. 22, pp. 1647-1649.*

(Continued)

*Primary Examiner* — Gordon J Stock, Jr.
(74) *Attorney, Agent, or Firm* — Kane Kessler

(57) ABSTRACT

Apparatus and method of simultaneously measuring a parameter of a plurality of cores in at least one optical fiber. An input tester at a first end of the test fiber has a plurality of tester signal inputs with a geometry substantially matching at least a portion of the core geometry of the fiber. At least one test input signal source coupled to the plurality of tester signal inputs. A signal measuring device is alignable at a second end of the fiber to measure the output of the test input signal. The input tester may include a tapered multicore coupler or a laser having a shield with apertures disposable between the laser and the fiber. In the latter case, a lens may be disposed between the shield and the fiber to project light from the laser that passes through the apertures onto the end of the fiber.

10 Claims, 3 Drawing Sheets

(56) References Cited

U.S. PATENT DOCUMENTS

| | | | | |
|---|---|---|---|---|
| 6,456,369 | B1* | 9/2002 | Ohki | G02B 6/3807 356/73.1 |
| 6,556,751 | B1* | 4/2003 | Lee | G02B 6/3636 385/22 |
| 8,425,126 | B2* | 4/2013 | Imamura | G02B 6/02042 264/1.25 |
| 8,842,268 | B2* | 9/2014 | Hayashi | G01M 11/335 356/73.1 |
| 8,923,668 | B2* | 12/2014 | Hayashi | G01M 11/088 385/31 |
| 2009/0180734 | A1* | 7/2009 | Fiorentino | G02B 6/43 385/31 |
| 2009/0185171 | A1* | 7/2009 | Kristensen | G01M 11/335 356/73.1 |
| 2009/0262337 | A1* | 10/2009 | Nicholson | G01M 11/335 356/73.1 |
| 2011/0222052 | A1* | 9/2011 | Sengupta | G01M 11/332 356/73.1 |
| 2011/0274398 | A1* | 11/2011 | Fini | G02B 6/0365 385/124 |
| 2011/0274435 | A1* | 11/2011 | Fini et al. | 398/139 |
| 2011/0280517 | A1* | 11/2011 | Fini | G02B 6/02042 385/43 |
| 2013/0194566 | A1* | 8/2013 | Schell et al. | 356/73.1 |
| 2013/0302002 | A1* | 11/2013 | Imamura | G02B 6/02042 385/127 |

OTHER PUBLICATIONS

Zhu, B., et al., "Seven-core multicore fiber transmissions for passive optical network," May 24, 2010, Optics Express, vol. 18, No. 11, pp. 11117-11122.*

Zhu et al., 7×10-Gb/s Multicore Multimode Fiber Transmissions for Parallel Optical Data Links, IEEE Photonics Technology Letters, vol. xx, No. x, Month yyyy. 2010.

Zhu et al., 10-Gb/s Seven Core Multicore Fibre Transmissions, OFS Labs, no date.

Jespersen et al., Measuring Distributed Mode Scattering in Long, Few-Moded Fibers, OFS Fitel Denmark and OFS Labs, Jan. 23, 2012.

Nicholson et al. Spatially and spectrally resolved imaging of modal content in large-mode-area fibers, OFS Laboratories, 2008.

* cited by examiner

DEVICE AND METHOD TO MEASURE THE DMD AND OTHER PARAMETERS OF A MULTICORE OPTICAL FIBER

RELATED APPLICATIONS

Priority is claimed from U.S. Provisional Patent Application No. 61/724,145 filed Nov. 8, 2012 entitled "Method to Measure The DMD of a Multimode Multicore Fiber", the teachings of which are hereby incorporated by reference herein.

BACKGROUND OF THE INVENTION

Field of the Invention

The invention relates to optical fiber, and more specifically to methods and apparatuses for measuring one or more parameters of multiple cores at the same time in one or more optical fibers.

Description of Related Art

Optical interconnects and fiber optic links are becoming more and more prevalent not only for top-ranked super computer systems, but also for high performance data centers. This is due in large part to the superior bandwidth-distance product that they provide. This exponential growth in fiber volume has led to new and challenging design constraints for future systems. Consequently, increasing bandwidth per fiber, while minimizing further increases in link cost and power, is of paramount importance for the design of future optical interconnects. Among the promising solutions to increase bandwidth per fiber, while minimizing further increases in link cost and power, is to use Multimode Multicore Fibers (MM MMF), as demonstrated recently by Zhu & al and Lee & a. (See, e.g., "7×10-Gb/s Multicore Multimode Fiber Transmissions for Parallel Optical Data Links", Benyuan Zhu, Thierry F. Taunay, et al., IEEE Photonic Tech. Lett., p. 1674-1649, vol. 22, (2010); "Multimode Transceiver for Interfacing to Multicore Graded-Index fiber Capable of Carrying 120-Gb/s over 100-m Lengths", Lee, B. G.; Kuchta, D. M.; et al., N $23^{rd}$ Annual Meeting of IEEE Photonic Society, (2010), p. 564-565, the teachings of which are incorporated by reference herein.)

One of the key issues which will determine the practicality and ultimately the performance of MM MCF is the ability to easily characterize fiber performance, and in particular the DMD of the individual cores of the MM MCFs. Differential Measurement Delay (DMD) method has been developed and standardized (TIA/EIA-455-220) as an accepted way to characterize the laser optimized high bandwidth MMF, which support high data rate digital transmission applications. In the DMD measurement, as shown in exemplary FIG. 1A, a short optical pulse with small spot size (e.g., ~4 μm) is launched into the core 4 (e.g., ~50 μm) of one MMF 6 end face 5 that is under test via a single core fiber 2. The resulting signal is measured at the output end face 7. Measurement is repeated as the spot scans gradually from the core center towards the cladding, and output pulses at the other MMF end face from each location are recorded and form the DMD pattern. The latter exhibits travel-time difference between the different modes ensemble excited for different probe positions, and the pulse broadening for the intermodal dispersion between mode groups. The spot size at MMF end face should be much smaller than MMF core size and can be originated from either a single mode fiber or image of the end of a single mode fiber.

While the current method to characterize MMF DMD is adequate for single core fibers, there are several major issues when it is applied to MM MCF. First, it is technically difficult to aligned launch fiber of image with the cores, which are not all located at the center of FUT. Second, measurement time for a MM MCF with N cores will be N times longer. Additionally, drift can occur owing to changes in temperature and other environmental variables over time and as caused by subjecting the FUT to a laser for an extended period of time.

SUMMARY OF THE INVENTION

To address these issues for multicore fibers (MCFs), the invention is a technique to measure a parameter such as DMD, spatially and spectrally resolved imaging of modal content ($S^2$), or the like of all (or at least a plurality) of the cores in an MCF, or in a bundle of fibers, in one single scan. To reduce the time it will take to measure the DMD of the N cores of, for example, a multimode (MM) MCF fiber with the current technique used in the industry, i.e. butt coupling to the MM core with the single mode single core, SM SC fiber, the invention includes fabricating a single mode MCF whose cores pattern matches the cores pattern of the MM MCF fiber.

More specifically, the invention includes a method of simultaneously measuring at least one parameter of a plurality of cores in at least one optical fiber to be tested. The inventive method includes the step of a) preparing an input tester having i) a plurality of tester signal inputs with a geometry substantially matching at least a portion of the core geometry of the fiber to be tested, and ii) at least one test input signal source coupled to the plurality of tester signal inputs. The inventive method includes the step of b) aligning the plurality of tester signal inputs with the corresponding plurality of cores in the fiber to be tested at a first end of the fiber to be tested. The inventive method includes the step of c) firing at least one test input signal from the test input signal source through the input tester to the plurality of cores in the fiber being tested. The inventive method also includes the step of d) measuring the output of the test input signal emerging from a second end of the fiber being tested.

Measuring step d) is preferably performed by a second tapered multicore coupler. Alternatively, measuring step d) may be performed by a charge-coupled device. The parameter being measured may include at least one of DMD, $S^2$, spectral attenuation, chromatic dispersion, group delay, polarization mode dispersion, or the like. A known method of measuring $S^2$ in a single fiber is described in "Spatially and Spectrally Resolved Imaging of Modal Content in Large-mode-area Fibers", J. W. Nicholson et al., 2008 Optics Express Vol. 16, No. 10 pp. 7233-7243, the teachings of which are incorporated by reference herein. Methods of measuring other parameters in single fibers are also known by one of ordinary skill in the art.

In one embodiment, the plurality of cores being tested are all in a single multicore fiber. Alternatively, the plurality of cores being tested are in a bundle of multiple fibers, with at least one core in each fiber.

Preferably, the input tester includes a first tapered multicore coupler, and the tester signal inputs include tester cores. Alternatively, the input tester includes a laser and the tester signal inputs include apertures in a shield disposable between the laser and the first end of the fiber to be tested. In either case, step c) further includes the step of firing an optical as the test input signal.

In most cases, the method includes the step of moving one of the input tester or the fiber to be tested with respect to the other so as to scan the test input signal with respect to the fiber to be tested.

The invention also includes an apparatus adapted to simultaneously measure at least one parameter of a plurality of cores in at least one optical fiber to be tested. The inventive apparatus includes an input tester disposable at a first end of the fiber to be tested and alignable with the corresponding plurality of cores in the fiber to be tested. The input tester has a plurality of tester signal inputs with a geometry substantially matching at least a portion of the core geometry of the fiber to be tested, and at least one test input signal source coupled to the plurality of tester signal inputs. The apparatus also includes a signal measuring device alignable at a second end of the fiber being tested and adapted to measure the output of the test input signal emerging from the fiber being tested.

In one embodiment, the input tester further includes a first tapered multicore coupler and the tester signal inputs include tester cores. Alternatively, the input tester includes a laser and the tester signal inputs include apertures in a shield disposable between the laser and the first end of the fiber to be tested. In the latter case, at least one lens is preferably disposed between the shield and the first end of the fiber to be tested so as to project light from the laser that passes through the apertures onto the first end of the fiber to be tested.

The at least one test input signal source may include a single optical signal source coupled to all of the tester signal inputs. Alternatively, it may include a plurality of optical signal sources each respectively coupled to one of the tester signal inputs.

The measuring device aligned at the second end of the to-be-tested fiber may include a second tapered multicore coupler, or a charge-coupled device, or the like.

The inventive apparatus preferably includes a translational scanning mechanism coupleable to at least one of the input tester or the fiber to be tested so as to scan the test input signal with respect to the fiber to be tested.

DETAILED DESCRIPTION OF THE INVENTION AND DRAWINGS

Figure 1:
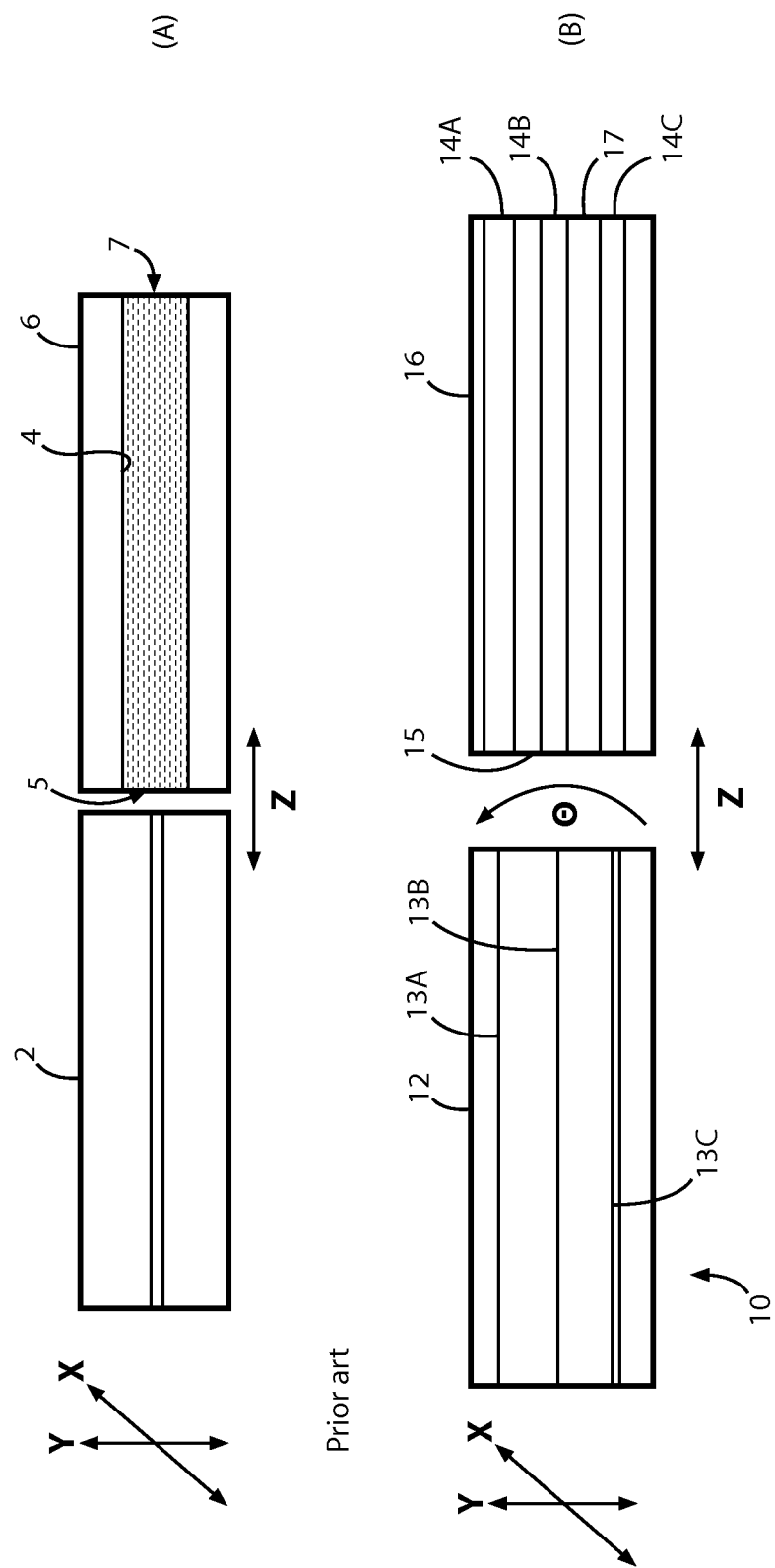
FIG. 1A is a schematic of a conventional method of determining a parameter such as DMD in s single core optical fiber.
FIG. 1B is a schematic of a method of determining a parameter such as DMD in a multimode multicore optical fiber in accordance with the invention.

Description will now be given with reference to the attached FIGS. 1-3. It should be understood that these figures are exemplary in nature and in no way serve to limit the scope of the invention, which is defined by the claims appearing hereinbelow.

In the inventive setup 10 shown schematically in FIG. 1B, an input tester 12 is disposable at a first end 15 of the fiber to be tested 16 and alignable with the corresponding plurality of cores 14A-C in the fiber to be tested 16. The input tester 12 has a plurality of tester signal inputs 13A-C with a geometry substantially matching at least a portion of the core geometry of the fiber to be tested, and at least one test input signal source coupled to the plurality of tester signal inputs (to be discussed below). Comparably to testing a single core MMF 6 (FIG. 1a), both input tester fiber 12 and fiber to be tested 16 have their end faces aligned and brought in close contact (~5-10 um). In addition, the respective fibers 12, 16 are rotated in order to have their outer cores aligned (FIG. 1b). As above, one of the fibers 12, 16 is scanned with respect to the other.

As with conventional parametric fiber measurements such as DMD, input pulses with narrow linewidth are launched into each individual core 13A-C of the input tester fiber 12, which is preferably (but not necessarily) a single mode (SM) MCF.

Figure 2:
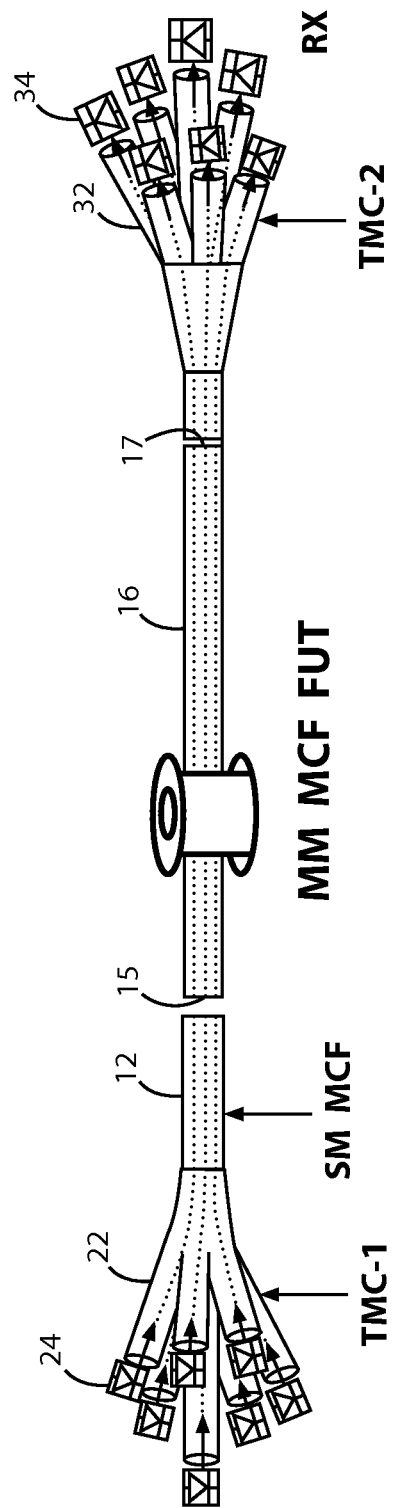
FIG. 2 is a side schematic of a parameter measuring setup in accordance with one embodiment of the invention.

One embodiment of the invention utilizes an input tapered multicore fiber connector (TMC) TMC-1 in FIG. 2 spliced to the probe MCF input tester fiber 12. The TMC-1 is designed so as to have both its core to core spacing and output mode field diameter (MFD) matching the cores 13A-C of the probe input tester fiber 12. TMC-1 may have multiple emitters 24 each connected to a leg 22 of the TMC, or a single signal source may be connected to all of the legs 22 of TMC-1. At the input end, the MFD can be chosen based on the method to launch optical pulse into the TMC-1. The optical power from a laser can be split equally into the same number of beam as core counts in FUT by either fiber splitter or free beam splitter. Another TMC, TMC-2, is located at the receiving of the measurement set up adjacent fiber end 17. TMC-2 is made from a specially designed pigtail MMF and spliced to a short length of (MM) MCF whose characteristics (core spacing, OD, and NA) are also essentially identical to the FUT 16. As an alternative, a micro-optics array (not shown) may be used with dimensions matching the FUT to image the outputs of the FUT to the detectors.

Once all the necessary alignments are completed, the output end of the probe fiber 12 is scanned across the FUT 16 with the aid of a close loop piezo-electric system with nanometer resolution. The output pulses from each core of the FUT are detected with an optical to electrical detector(s) 34 that is connected to leg(s) 32 of TMC-2, and the DMD (or other parameter) of each core is recorded.

The general inventive concept is measurement of a spatially-multiplexed fiber using a spatially-multiplexed detection scheme. This is advantageous for reducing setup and measurement time by integration. Additionally, this concept prevents any drift in the accuracy of the measurement since the measurement time will be >N times longer with the current method. Temperature induced fluctuations of the laser or the fiber will affect DMD measurement. The cores in an MCF could be measured one by one or simultaneously, but spatially-multiplexed launching and collecting fibers with pattern matching FUT is a practical method for easy alignment. This may be applied to measuring the modal content of single mode fibers, few-moded (e.g., <18) MCF fibers, multimode (250-500) fibers, or any other variety of MCF.

While methods to measure DMD in MM optical fiber are well known, current devices rely on launching probe pulse signal from a single core single mode fiber or image of single beam aperture, which restricts the speed at which a parameter such as DMD for a given MM MCF can be characterized. In addition, since the measurement time is increased by more than N times there is significant risk that minute temperature change may affect measurement.

The invention alleviates these issues. First, an MCF (preferably SM) is fabricated having an outer glass diameter equal to the MCF under test. In addition the core to core spacing of the probe MCF SM fiber will match the one of the MM MCF under test. A probe signal from a laser or similar optical source will be split N times as N number of cores. The probe signal carried by each core of SM MCF fiber is injected separately into the SM cores with a specially designed TFB or TMC spatially multiplexing N probe signals from SC SM fibers into the SM MCF. In order to prevent any measurement noise resulting from induced cross-talk between the TFB/TMC and the SM MCF, time delay lines can be inserted prior to the TFB.

This invention addresses a crucial issue and builds on and extends the functionality of existing measurement. With the proposed improvements, the total DMD measurement time will be significantly reduced, and its ultimate accuracy will be significantly enhanced. Hence, MM MCF fiber characterization cost will be minimized.

Figure 3:
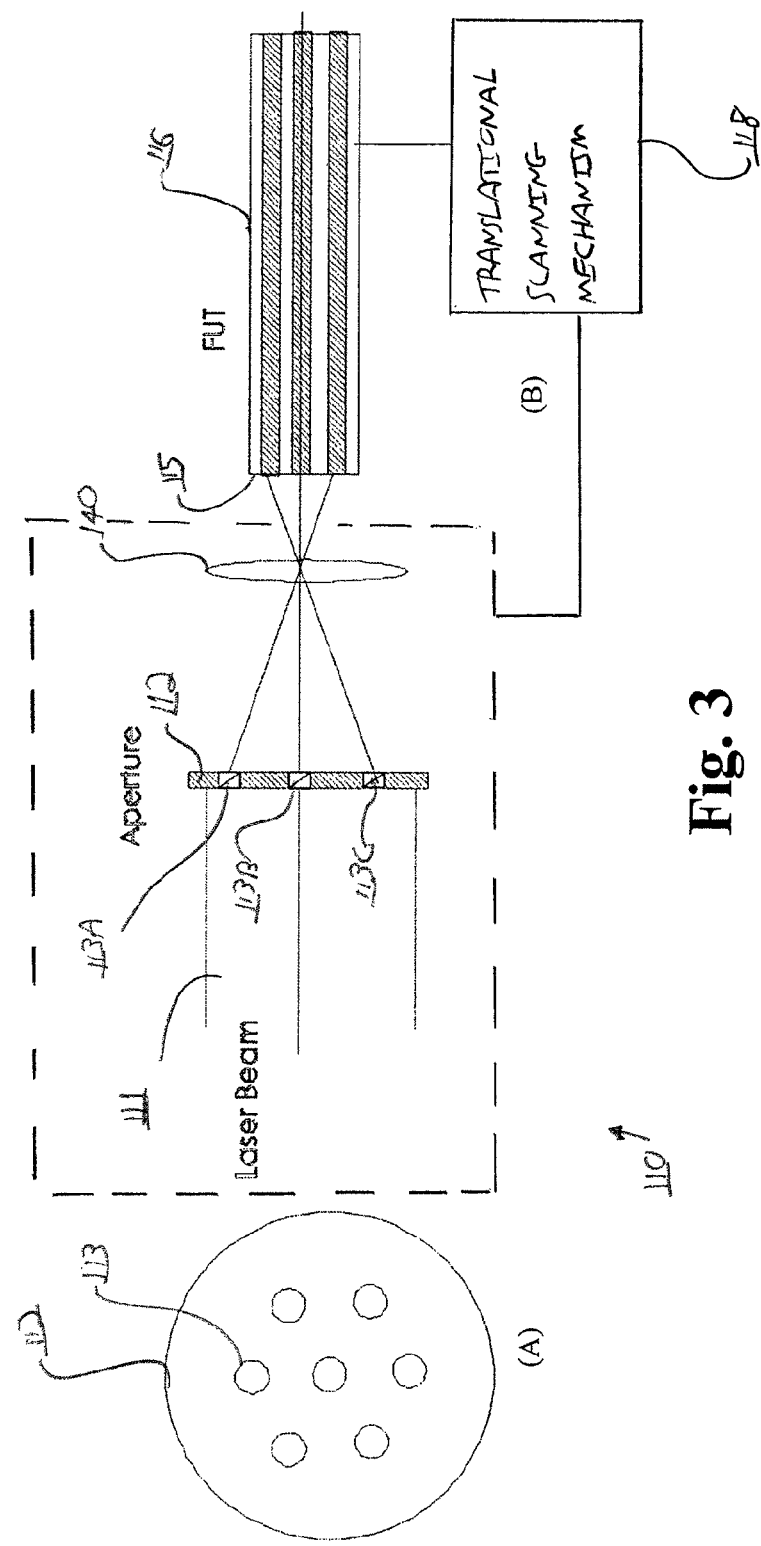
FIGS. 3A-B are a schematic of a parameter measuring setup in accordance with another embodiment of the invention.

Another embodiment 110 of the inventive system is depicted in FIG. 3. After being expanded and collimated, a laser beam 111, preferably transversely single mode, illuminates a special designed shield 112 having a plurality of apertures 113. The image of the apertures 113 is projected onto the input end 115 of FUT 116 by a lens system 140. This shield 112 should 1, have the same number of apertures 113 in substantially the same configuration as the cores of FUT 116. An advantage of this approach is that the setup can measure the DMD of the FUT with different core patterns by simply replacing the shield 112 with a corresponding pattern of apertures 113A, 113B and 113C.

In both approaches, FUT 116 or system 110 may be mounted on a motorized translation stage 118 with submicron precision. Once all the necessary alignments are completed, the image of the aperture can scan across FUT by controlling the translation stage.

In both approaches, the same methods described above could be utilized to transmit the resulting signal from FUT to detectors. The output pulses from each core of the FUT are detected and the DMD of all the cores are recorded at the same time.

The invention is not limited to the above description. For example, instead of close contact with the FUT, the image of the output end of the MCF described above may be projected onto the input end of the FUT. Additionally, although the preferred embodiment of the invention measures a parameter of all of the cores in an MCF, it is also contemplated to measure all of the cores of a fiber bundle in a similar manner. Conversely, it is contemplated to measure fewer than all of the cores of an MCF or fiber bundle at once. For example, if an MCF has nine cores, an apparatus in accordance with the invention could measure three cores at a time, rather than all nine (as above) or one at a time (as in the conventional method). This would still be more efficient than measuring each core separately, albeit not as efficient as measuring all cores at the same time. Similarly, different parameters may be measured at the same time in different cores. So, back to the nine-core example, the inventive apparatus may be configured to measure DMD in four of the cores while measuring $S^2$ in the other five cores. It is likely more convenient to measure parameters simultaneously that have similar test steps. For example, measuring both DMD and $S^2$ require scanning, whereas measuring polarization mode dispersion and loss could be accomplished in a single launch. Other variations are also contemplated.

Having described certain embodiments of the invention, it should be understood that the invention is not limited to the above description or the attached exemplary drawings. Rather, the scope of the invention is defined by the claims appearing hereinbelow and includes any equivalents thereof as would be appreciated by one of ordinary skill in the art.

What is claimed is:

1. A method of simultaneously measuring at least one parameter of a plurality of cores in at least one optical fiber to be tested, comprising the steps of:
   a) preparing an input tester having i) a plurality of tester signal inputs with a geometry substantially matching at least a portion of the core geometry of the fiber to be tested, and ii) at least one test input signal source coupled to the plurality of tester signal inputs;
   b) aligning the plurality of tester signal inputs with the corresponding plurality of cores in the fiber to be tested at a first end of the fiber to be tested;
   c) firing at least one test input signal from the test input signal source through the input tester to the plurality of cores in the fiber being tested; and
   d) measuring the output of the test input signal emerging from a second end of the fiber being tested,
   wherein the input tester includes a laser and the tester signal inputs include apertures in a shield disposable between the laser and the first end of the fiber to be tested.

2. A method of simultaneously measuring at least one parameter of a plurality of cores in a multicore optical fiber to be tested according to claim 1, wherein said measuring step d) is performed by a second tapered multicore coupler.

3. A method of simultaneously measuring at least one parameter of a plurality of cores in a multicore optical fiber to be tested according to claim 1, wherein said measuring step d) is performed by a charge-coupled device.

4. A method of simultaneously measuring at least one parameter of a plurality of cores in a multicore optical fiber to be tested according to claim 1, wherein the parameter being measured is at least one of DMD, $S^2$, modal content, spectral attenuation, chromatic dispersion, group delay, or polarization mode dispersion.

5. A method of simultaneously measuring at least one parameter of a plurality of cores in a multicore optical fiber to be tested according to claim 1, further comprising the step of moving one of the input tester or the fiber to be tested with respect to the other so as to scan the test input signal with respect to the fiber to be tested.

6. An apparatus adapted to simultaneously measure at least one parameter of a plurality of cores in at least one optical fiber to be tested, comprising:
   an input tester disposable at a first end of the fiber to be tested and alignable with the corresponding plurality of cores in the fiber to be tested, having:
      a plurality of tester signal inputs with a geometry substantially matching at least a portion of the core geometry of the fiber to be tested, and
      at least one test input signal source coupled to said plurality of tester signal inputs; and
   a signal measuring device alignable at a second end of the fiber being tested and adapted to measure the output of the test input signal emerging from the fiber being tested,
   wherein said input tester further comprises a laser and said tester signal inputs include apertures in a shield disposable between said laser and the first end of the fiber to be tested.

7. An apparatus adapted to simultaneously measure at least one parameter of a plurality of cores in a multicore optical fiber to be tested according to claim 6, further comprising at least one lens disposed between said shield and the first end of the fiber to be tested, said lens projecting light from said laser that passes through said apertures onto the first end of the fiber to be tested.

8. An apparatus adapted to simultaneously measure at least one parameter of a plurality of cores in a multicore optical fiber to be tested according to claim 6, wherein said measuring device comprises a second tapered multicore coupler.

9. An apparatus adapted to simultaneously measure at least one parameter of a plurality of cores in a multicore optical fiber to be tested according to claim 6, wherein said measuring device comprises a charge-coupled device.

10. An apparatus adapted to simultaneously measure at least one parameter of a plurality of cores in a multicore optical fiber to be tested according to claim 6, further comprising a translational scanning mechanism coupleable to at least one of said input tester or the fiber to be tested so as to scan said test input signal with respect to the fiber to be tested.

* * * * *